(12) United States Patent
Bharadwaj et al.

(10) Patent No.: US 8,477,672 B2
(45) Date of Patent: Jul. 2, 2013

(54) 4C-HSDPA ACKNOWLEDGMENT SIGNALING

(75) Inventors: Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 12/905,007

(22) Filed: Oct. 14, 2010

(65) Prior Publication Data

US 2011/0249604 A1 Oct. 13, 2011

Related U.S. Application Data

(60) Provisional application No. 61/303,301, filed on Feb. 10, 2010.

(51) Int. Cl.
*H04W 4/00* (2009.01)
(52) U.S. Cl.
USPC ........................................................ 370/311
(58) Field of Classification Search
USPC ........................................................ 370/311
See application file for complete search history.

(56) References Cited

U.S. PATENT DOCUMENTS

| | | | |
|---|---|---|---|
| 7,006,464 B1 | 2/2006 | Gopalakrishnan et al. | |
| 2001/0051529 A1 | 12/2001 | Davies | |
| 2005/0250497 A1 | 11/2005 | Ghosh et al. | |
| 2005/0250511 A1 | 11/2005 | Xiao et al. | |
| 2006/0203779 A1 | 9/2006 | Attar et al. | |
| 2006/0221883 A1* | 10/2006 | Damnjanovic et al. | 370/315 |
| 2006/0282740 A1 | 12/2006 | Gu et al. | |
| 2009/0245212 A1 | 10/2009 | Sambhwani et al. | |
| 2010/0074120 A1 | 3/2010 | Bergman et al. | |
| 2010/0113004 A1 | 5/2010 | Cave et al. | |
| 2010/0281322 A1 | 11/2010 | Park et al. | |
| 2012/0020264 A1* | 1/2012 | Lehti et al. | 370/311 |

OTHER PUBLICATIONS

Interdigital Communications et al., "Considerations of HS-DPCCH Design for 4-carrier HSDPA", 3GPP Draft, R1-100470, 3rd Generation Partnership Project 3GPP), Mobile Competence Centre, 650, Route Des Lucioles, F-06921 Sophia-Antipolis Cedex, France, vol. RAN WGI, no. Valencia, Spain, 20100118, Jan. 12, 2010, XP050418108, [retrieved on Jan. 12, 2010].
International Search Report and Written Opinion—PCT/US2011/024412, ISA/EPO—May 3, 2011.
Qualcomm Europe: "HS-DPCCH ACK/NACK Code Book Design for 4C-HSDPA", 3GPP Draft, R1-094068 HS-DPCCH A N Design 4C HSDPA 3rd Generation Partnership Project (3GPP), Mobile Competence Centre, 650, Route Des Lucioles, F-06921 Sophia-Antipolis Cedex, France, no. Miyazaki, Oct. 12, 2009, XP050388548, [retrieved on Oct. 6, 2009].

(Continued)

*Primary Examiner* — Sulaiman Nooristany
(74) *Attorney, Agent, or Firm* — Darren M Simon

(57) ABSTRACT

Techniques for signaling acknowledgment status (e.g., ACK, NACK, or DTX) for up to four detected carriers according to 4C-HSDPA. In an exemplary embodiment, an ACK slot of an HS-DPCCH channel utilizes spreading factor 128 to accommodate two 10-symbol codewords per slot. The codewords may be dual-carrier codewords, enabling the acknowledgment status of up to four carriers to be signaled in each slot. A DTX-DTX codeword may be further provided to signal no detection of two carriers assigned to the same codeword. In an alternative exemplary embodiment, a codeword signaling acknowledgment status for two carriers may be repeated twice over a single slot.

18 Claims, 13 Drawing Sheets

OTHER PUBLICATIONS

Qualcomm Incorporated: "Physical Layer Design for 4C-HSDPA", 3GPP Draft, R1-100278 Physical Layer Design for 4C-HSDPA 3rd Generation Partnership Project (3GPP), Mobile Competence Centre, 650, Route Des Lucioles, F-06921 Sophia-Antipolis Cedex, France, vol. RAN WGI, no. Valencia, Spain, Jan. 18, 2010, Jan. 12, 2010, XP050417956, [retrieved on Jan. 12, 2010].

ZTE: "HS-DPCCH HARQ-ACk design for 4C-HSDPA", Draft, R1-100510_HS-DPCCH_HARQ-ARQ Design_4C-HSDP A, 3rd Generation Partnership Project (3GPP), Mobile Competence Centre, 650, Route Des Lucioles, F-06921 Sophia-Antipolis Cedex, France, vol. RAN WGI, no. Valencia, Spain, Jan. 18, 2010, Jan. 12, 2010, XP050418141, [retrieved on Jan. 12, 2010].

* cited by examiner

4C-HSDPA ACKNOWLEDGMENT SIGNALING

RELATED APPLICATIONS

The present application claims the benefit of U.S. Provisional Patent Application Ser. No. 61/303,301, entitled "HS-DPCCH Code Mapping for 4C-HSDPA," filed on Feb. 10, 2010, assigned to the assignee of the present application, the contents of which are hereby incorporated by reference in their entirety.

TECHNICAL FIELD

The present invention relates generally to wireless communications, and more specifically, to techniques for acknowledgment status message signaling in wireless communications systems.

BACKGROUND

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

High-speed downlink packet access (HSDPA) is a protocol for high-speed data transfer in mobile cellular networks based on the W-CDMA standard, or 3GPP. In a version of HSDPA known as dual cell HSDPA (DC-HSDPA), data from a Node B to a UE may be transmitted on the downlink using up to two carriers. On the UE side, the UE may signal the acknowledgment status of the downlink carriers by transmitting ACK, NACK, or DTX on an uplink channel, e.g., an HS-DPCCH channel.

In prior implementations of multi-carrier HSDPA, a signaling mechanism is provided in which the acknowledgment status for up to two carriers is mapped onto a specific codeword according to a codebook, and the symbols of the codeword are spread onto the HS-DPCCH channel using a spreading factor of 256. In a newer version of HSDPA known as four carrier HSDPA (4C-HSDPA), wherein up to four carriers may be transmitted to the UE on the downlink, alternative signaling mechanisms on the uplink are needed to signal the acknowledgment status for the greater number of downlink carriers.

It would be desirable to provide an acknowledgment status signaling scheme for 4C-HSDPA which advantageously utilizes existing techniques, e.g., pre-existing HSDPA channel formats and codebooks, to the greatest extent possible. It would be further desirable to introduce new techniques, e.g., new channel formats and new codewords, as necessary to accommodate the additional scenarios that specifically arise in 4C-HSDPA.

SUMMARY

An aspect of the present disclosure provides a method comprising: transmitting acknowledgment status for first and second carriers during a first half of a HS-DPCCH slot.

Another aspect of the present disclosure provides an apparatus comprising: a carrier detection module configured to detect at least one carrier present in a received signal for an HSDPA system; a carrier reception module configured to decode data from at least one detected carrier; an encoder configured to generate a codeword signaling acknowledgment status for first and second carriers based on the output of the carrier detection module and the carrier reception module; a transmit module configured to transmit the codeword during a first half of an HS-DPCCH slot.

Yet another aspect of the present disclosure provides an apparatus comprising: means for transmitting acknowledgment status for first and second carriers during a first half of a HS-DPCCH slot.

Yet another aspect of the present disclosure provides a computer-readable storage medium storing instructions for causing a computer to: transmit acknowledgment status for first and second carriers during a first half of a HS-DPCCH slot.

Yet another aspect of the present disclosure provides a method comprising: receiving acknowledgment status for first and second carriers during a first half of a HS-DPCCH slot.

Yet another aspect of the present disclosure provides an apparatus comprising: a receive module configured to receive a codeword signaling acknowledgment status for first and second carriers during a first half of an HS-DPCCH slot; and a decode module configured to decode the codeword signaling acknowledgment status.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The detailed description includes specific details for the purpose of providing a thorough understanding of the exemplary embodiments of the invention. It will be apparent to those skilled in the art that the exemplary embodiments of the invention may be practiced without these specific details. In some instances, well known structures and devices are shown in block diagram form in order to avoid obscuring the novelty of the exemplary embodiments presented herein.

Figure 1:
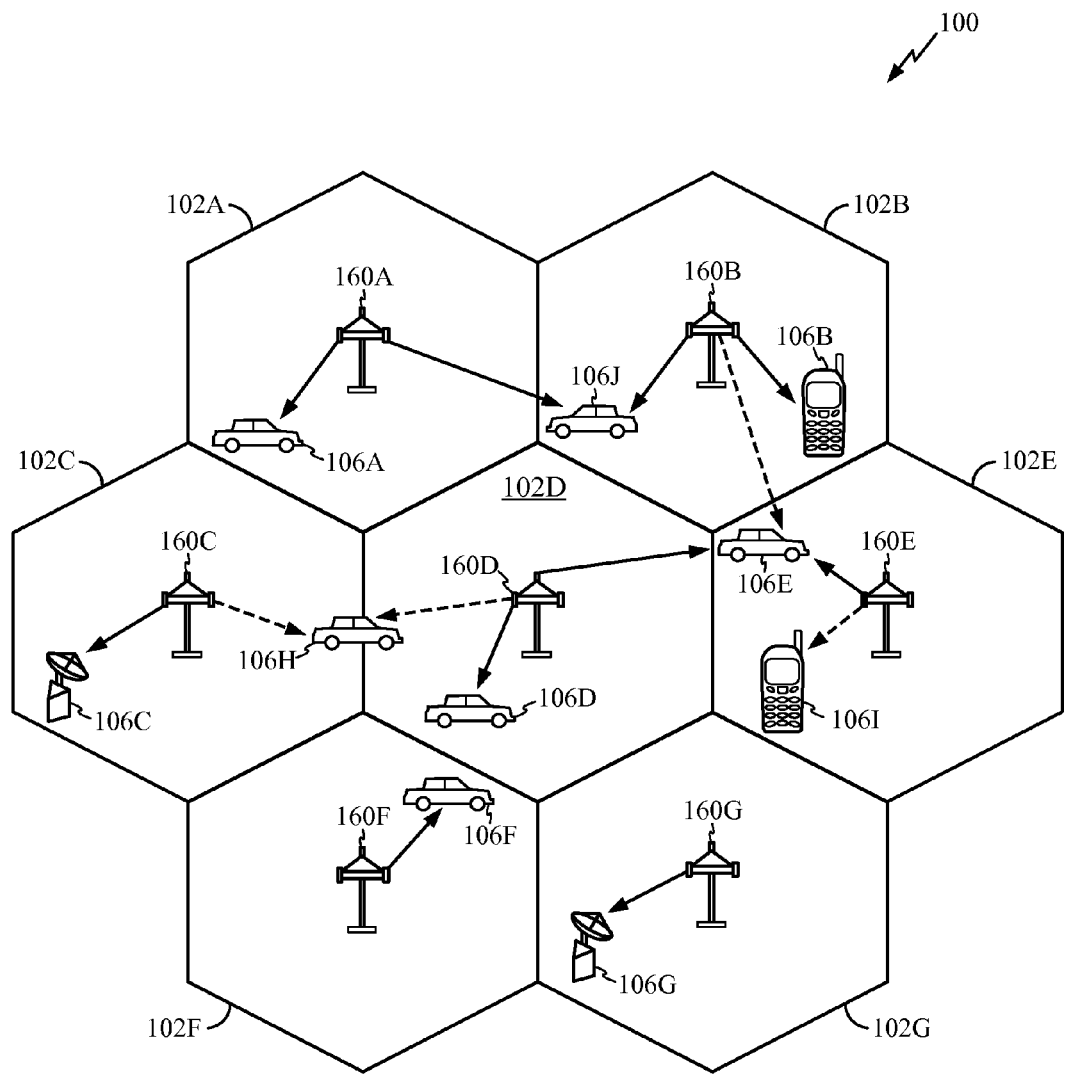
FIG. 1 illustrates an example of a wireless communications system.

Referring to FIG. 1, in a wireless cellular communications system 100, reference numerals 102A to 102G refer to cells, reference numerals 160A to 160G (collectively denoted 160) refer to Node B's, and reference numerals 106A to 106I (collectively denoted 106) refer to User Equipment (UE's). A communications channel includes a downlink (also known as a forward link) for transmissions from a Node B 160 to a UE 106 and an uplink (also known as a reverse link) for transmissions from a UE 106 to a Node B 160. Transmissions may be conducted using a multiple-input multiple-output (MIMO) or non-MIMO scheme. A Node B is also referred to as a base transceiver system (BTS), an access point, or a base station. The UE 106 is also known as an access station, a remote station, a mobile station or a subscriber station. The UE 106 may be mobile or stationary. Furthermore, a UE 106 may be any data device that communicates through a wireless channel or through a wired channel, for example using fiber optic or coaxial cables. A UE 106 may further be any of a number of types of devices including but not limited to PC card, compact flash, external or internal modem, or wireless or wireline phone.

Modern communications systems are designed to allow multiple users to access a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multiple-access techniques. The multiple-access concept is a channel allocation methodology which allows multiple users access to a common communications link. The channel allocations can take on various forms depending on the specific multi-access technique. By way of example, in FDMA systems, the total frequency spectrum is divided into a number of smaller sub-bands and each user is given its own sub-band to access the communications link. Alternatively, in CDMA systems, each user is given the entire frequency spectrum for all of the time but distinguishes its transmission through the use of a code.

While certain exemplary embodiments of the present disclosure may be described hereinbelow for operation according to a CDMA standard known as W-CDMA, one of ordinary skill in the art will appreciate that the techniques may readily be applied to other digital communications systems. For example, the techniques of the present disclosure may also be applied to systems based on the cdma2000 wireless communications standard, and/or any other communications standards. Such alternative exemplary embodiments are contemplated to be within the scope of the present disclosure.

Figure 2A:
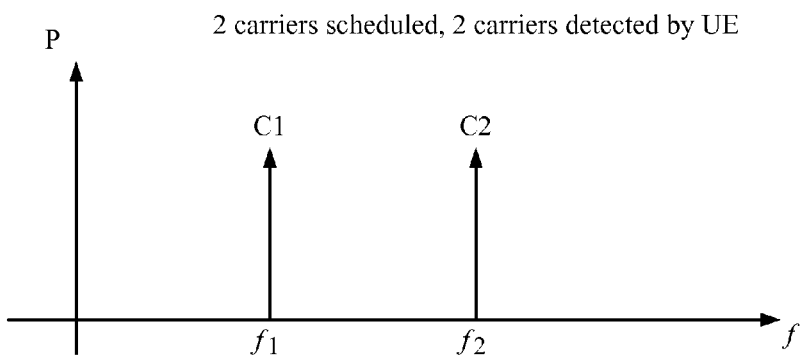
FIG. 2A illustrates an exemplary frequency spectrum showing two carriers C1, C2 scheduled for downlink transmission to a UE at frequencies $f_1$, $f_2$, respectively.

In an exemplary embodiment, one or more of the NodeB's 160 may transmit data to a UE 106 using multiple carriers on the downlink. According to an exemplary embodiment of HSDPA known as dual cell HSDPA (DC-HSDPA), a UE 106 may receive data from up to two carriers on a downlink channel (e.g., the HS-PDSCH) as transmitted by one or more NodeB's 160. FIG. 2A illustrates an exemplary frequency spectrum showing two logical carriers C1, C2 scheduled for downlink transmission to a UE at frequencies $f_1$, $f_2$, respectively. According to an exemplary embodiment of HSDPA known as four-carrier HSDPA (4C-HSDPA), UE 106A may receive data from up to four carriers. According to an exemplary embodiment known as DC-MIMO, UE 106A may receive data from up to two carriers configured for MIMO operation (i.e., "MIMO carriers"), while according to 4C-MIMO, UE 106A may receive data from up to four MIMO carriers. Such reception from multiple (HSDPA or MIMO) carriers may advantageously improve data quality received by the UE due to frequency diversity of the carriers, as well as increase maximum data throughput to the UE.

In an exemplary embodiment, the UE may acknowledge each of the multiple downlink carriers separately by transmitting on the uplink according to, e.g., ARQ or hybrid-ARQ schemes known in the art. For example, 3GPP TS 25 series V9.1.0 (2009-12) (hereinafter "Rel-9"), the contents of which are incorporated herein by reference, describes a scheme whereby a UE may signal an acknowledgment status message indicating ACK (acknowledgment), NACK (negative acknowledgment), or DTX (no detection) for up to two HSDPA downlink carriers on a single uplink channel known as the HS-DPCCH. (See, e.g., TS 25.212.)

Figure 2B:
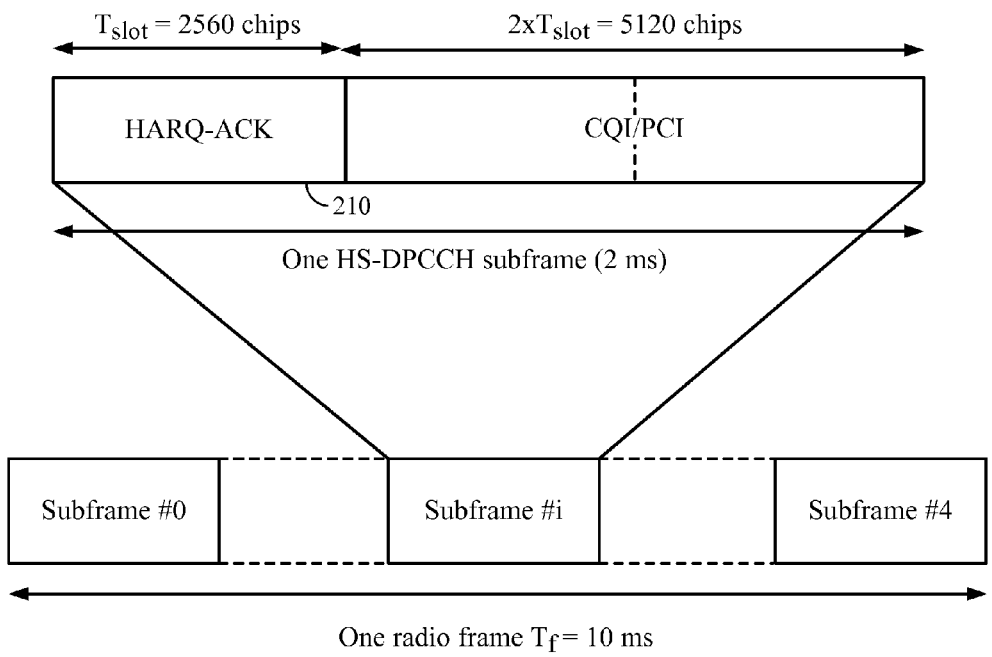
FIG. 2B illustrates a prior art channel structure for the HS-DPCCH as disclosed in Rel-9 of the W-CDMA standard.

FIG. 2B illustrates a prior art channel structure for the HS-DPCCH as disclosed in Rel-9, the contents of which are incorporated herein by reference. As shown in FIG. 2B, an HS-DPCCH radio frame may include a plurality of subframes, each subframe including an HARQ-ACK slot 210 having a duration of 2560 chips, or 1 slot.

Figure 2C:
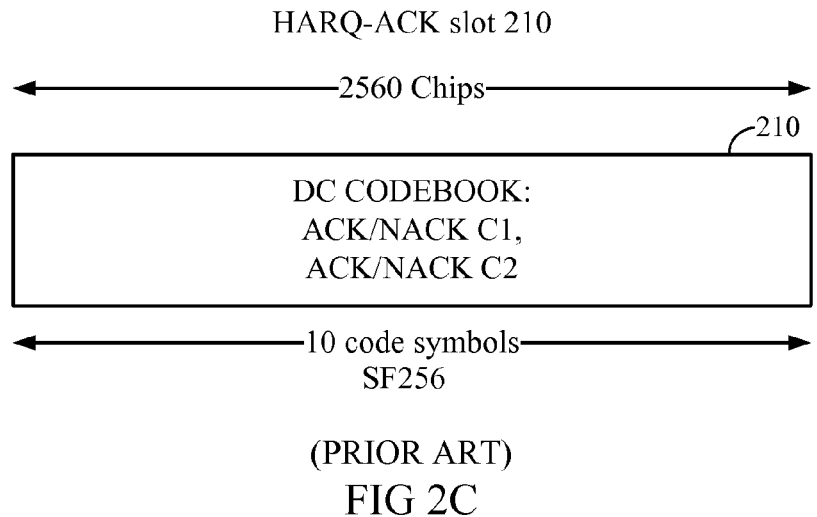
FIG. 2C illustrates information that may be transmitted in an HARQ-ACK slot according to prior art signaling techniques.

FIG. 2C illustrates information that may be transmitted in an HARQ-ACK slot 210 according to prior art signaling techniques. In an exemplary embodiment, a codeword of 10 code symbols may be transmitted in the HARQ-ACK slot 210 using a spreading factor (SF) of 256, and the codeword may signal ACK, NACK, or DTX for up to two carriers on the downlink. For example, the single codeword depicted in FIG. 2C may signal ACK, NACK, or DTX separately for the two scheduled carriers C1 and C2 shown in FIG. 2A. In an exemplary embodiment, for HSDPA carriers, a codebook such as provided in Section 4.7.3A of TS 25.212 may be used, while for MIMO carriers, a codebook such as provided in Section 4.7.3.B of TS 25.212 may be used. Alternatively, the MIMO codebook could be used for both MIMO and non-MIMO carriers. Note that the codebooks for HSDPA up to and including Rel-9 do not explicitly provide a codeword for simultaneously signaling DTX for two downlink carriers.

Note in this specification and in the claims, the term "detection" may include the process of the UE accurately decoding the HS-SCCH of a carrier. In an exemplary embodiment, the UE may signal DTX in response to the HS-SCCH of a carrier not being detected. On the other hand, the term "reception" may include the process of the UE decoding the HS-PDSCH of the carrier, assuming the carrier is detected. In an exemplary embodiment, the UE may signal NACK or ACK in response to the HS-PDSCH of the carrier being decoded with or without errors, respectively. Furthermore, one or more scheduled carriers may be "deactivated," in which case the NodeB does not schedule data on the deactivated carriers, while the UE does not expect data on the deactivated carriers, and hence does not attempt reception on those carriers. Such exemplary embodiments are contemplated to be within the scope of the present disclosure.

According to the present disclosure, novel techniques are provided for the HS-DPCCH to signal the acknowledgment status for up to four carriers (HSDPA or MIMO), e.g., as utilized in a 4C-HSDPA system, using the existing HS-DPCCH channel structure as shown in FIG. 2B.

Figure 3:
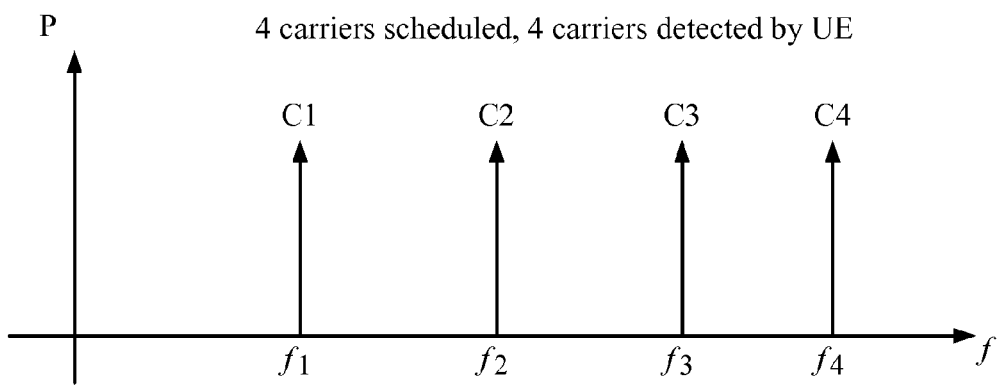
FIG. 3 illustrates an exemplary frequency spectrum showing four carriers C1, C2, C3, C4 detected by the UE at frequencies $f_1$, $f_2$, $f_3$, $f_4$, respectively.

FIG. 3 illustrates an exemplary frequency spectrum showing four carriers C1, C2, C3, C4 detected by the UE at frequencies $f_1$, $f_2$, $f_3$, $f_4$, respectively. Note FIG. 3 is shown for illustrative purposes only, and is not meant to limit the scope of the present disclosure to any particular combination or distribution of frequencies. For example, the ordering of the logical carriers (e.g., C1 through C4) need not correspond to the physical ordering of the channel frequencies (e.g., $f_1$ through $f_4$). In alternative exemplary embodiments, for example, C1 may be mapped to $f_4$, C2 may be mapped to $f_3$, etc. Furthermore, such correspondence need not be sequential, e.g., C1 may be mapped to $f_2$, C2 may be mapped to $f_4$, C3 may be mapped to $f_1$, etc. Such alternative exemplary embodiments are contemplated to be within the scope of the present disclosure.

Figure 4:
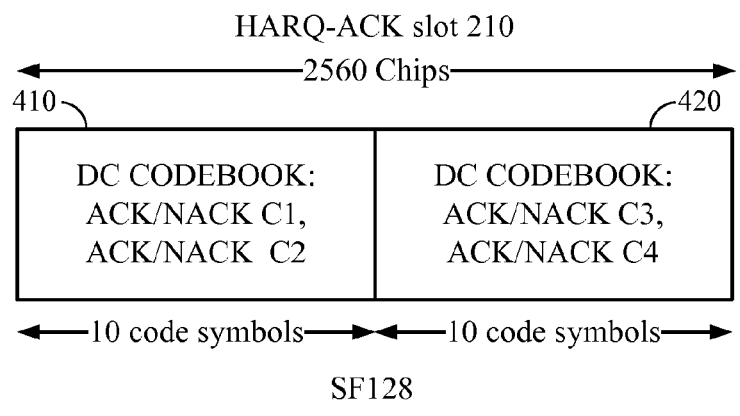
FIG. 4 illustrates an exemplary instance of an HARQ-ACK slot of the HS-DPCCH in which the UE may acknowledge the up to four downlink carriers as shown in FIG. 3.

To signal acknowledgment status for the carriers, the UE may utilize the HS-DPCCH channel as described with reference to FIG. 2B. FIG. 4 illustrates an exemplary instance of an HARQ-ACK slot 210 of the HS-DPCCH in which the UE may acknowledge the up to four downlink carriers as shown in FIG. 3.

In FIG. 4, it is seen that the spreading factor (SF) of the HARQ-ACK slot 210 is 128, such that two 10-symbol codewords 410, 420 may be serially time-multiplexed within the 2560 chips of the HARQ-ACK slot 210. The first codeword 410 is a 10-symbol codeword signaling ACK or NACK for scheduled carriers C1 and C2, and is provided in the first half of the slot 210. The second codeword 420 is a 10-symbol codeword signaling ACK or NACK for scheduled carriers C3 and C4, and is provided in the second half of the slot 210. In an exemplary embodiment wherein all carriers are HSDPA carriers, codewords 410, 420 may be selected from the same codebook as specified in Rel-9 for DC-MIMO.

Note in this specification and in the claims, the references to "first half" and "second half" of the slot 210 are for identification purposes only, and are not meant to imply that the first half necessarily precedes the second half in time.

Figure 5:
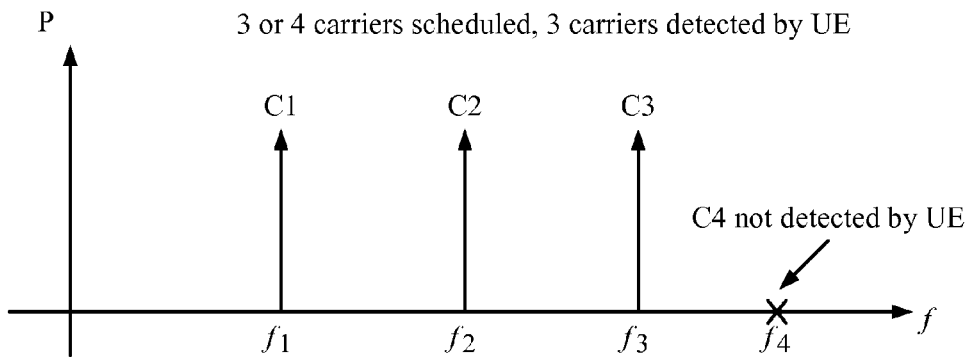
FIG. 5 illustrates an exemplary frequency spectrum showing three carriers C1, C2, C3 detected by the UE at frequencies $f_1$, $f_2$, $f_3$, respectively, with either three or four downlink carriers scheduled for the UE.

FIG. 5 illustrates an exemplary frequency spectrum showing three carriers C1, C2, C3 detected by the UE at frequencies $f_1$, $f_2$, $f_3$, respectively, with either three or four downlink carriers scheduled for the UE. In FIG. 5, a carrier corresponding to C4 and $f_4$ may be not scheduled by the Node B. Alternatively, a carrier corresponding to C4 and $f_4$ may be scheduled for the UE, but the corresponding HS-SCCH for C4 may be not accurately detected by the UE. In yet another alternative, the fourth carrier may be scheduled but selectively deactivated by the NodeB, such that the UE is configured with four carriers, but is active only on three. Note FIG. 5 is shown for illustrative purposes only, and is not meant to limit the scope of the present disclosure to any particular allocation of carrier frequencies, or any particular carrier or frequency not detected by the UE. One of ordinary skill in the art will appreciate that the techniques disclosed herein may be readily applied to other scenarios wherein three out of four carriers are detected by the UE.

Figure 6:
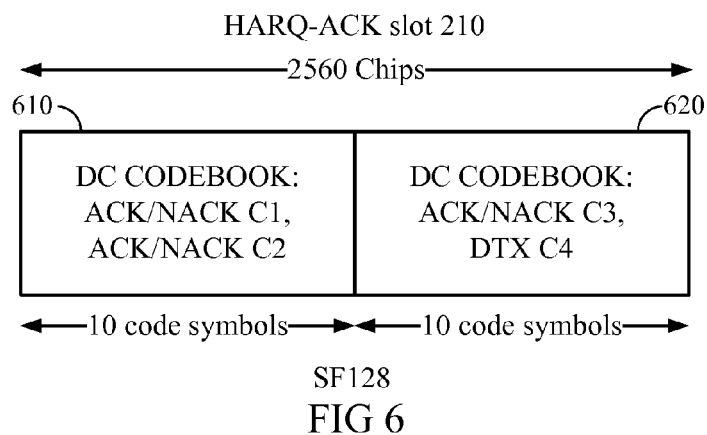
FIG. 6 illustrates an exemplary instance of an HARQ-ACK slot in which the UE signals acknowledgment status for the three downlink carriers shown in FIG. 5.

FIG. 6 illustrates an exemplary instance of an HARQ-ACK slot 210 in which the UE signals acknowledgment status for the three downlink carriers shown in FIG. 5. In FIG. 6, the first codeword 610 is a 10-symbol codeword signaling ACK or NACK for scheduled carriers C1 and C2. The second codeword 620 is a 10-symbol codeword signaling ACK or NACK for a single scheduled carrier C3, and a DTX for carrier C4, which may or may not have been scheduled. In an exemplary embodiment, codewords 610, 620 may be selected from the same codebook as specified in Rel-9 for DC-MIMO. Note it will be appreciated that the codewords may be selected from a DC-MIMO codebook even when there are no MIMO carriers.

One of ordinary skill in the art will appreciate that in an alternative exemplary embodiment (not shown), the codeword for the single carrier C3 may instead be chosen from a codebook for signaling the acknowledgment status for a single carrier. The single carrier codebook may be, e.g., the single carrier HSDPA codebook as described in 3GPP Rel-5, or the single carrier MIMO codebook as described in 3GPP Rel-7. The UE may utilize such a single carrier codeword for C3 when, e.g., C4 is deactivated, and both the UE and NodeB expect that C4 will not be transmitted. Such alternative exemplary embodiments are contemplated to be within the scope of the present disclosure.

While FIGS. 5 and 6 have been described for the case wherein a carrier C4 is the one out of four carriers not detected by the UE, one of ordinary skill in the art will appreciate that the techniques disclosed herein may be readily applied to a case wherein any of the carriers C1, C2, or C3 is the one out of four carriers not detected by the UE. For example, if only carriers C2, C3, C4 are detected, then the first codeword 610 in FIG. 6 may instead be chosen to signal DTX for C1 and ACK or NACK for C2, while the second codeword 620 may be chosen to signal ACK or NACK for C3, C4. Such exemplary embodiments are contemplated to be within the scope of the present disclosure.

Figure 7:
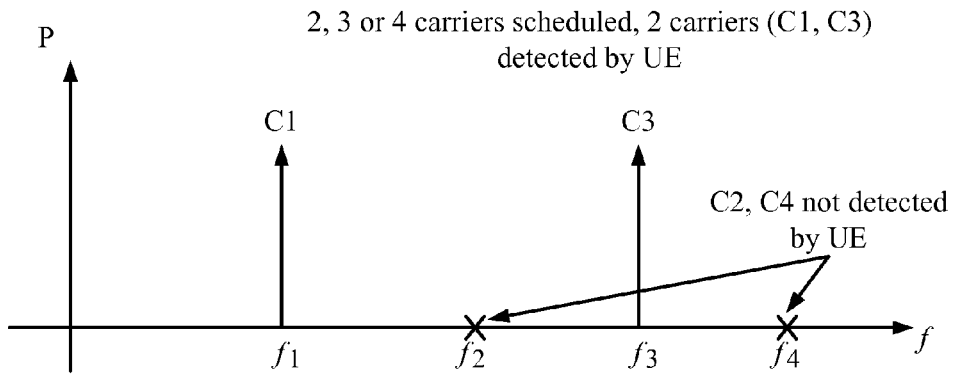
FIG. 7 illustrates an exemplary frequency spectrum showing two carriers C1, C3 detected by the UE at frequencies $f_1$, $f_3$, respectively, with either two, three or four downlink carriers scheduled for the UE.

FIG. 7 illustrates an exemplary frequency spectrum showing two carriers C1, C3 detected by the UE at frequencies $f_1$, $f_3$, respectively, with either two, three or four downlink carriers scheduled for the UE. Note FIG. 7 is shown for illustrative purposes only, and is not meant to limit the scope of the present disclosure to any particular allocation of carrier frequencies.

Figure 8:
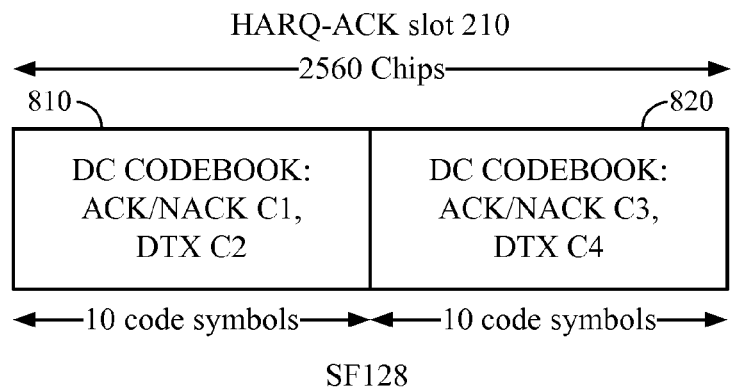
FIG. 8 illustrates an exemplary instance of an HARQ-ACK slot in which the UE acknowledges the two downlink carriers shown in FIG. 7.

FIG. 8 illustrates an exemplary instance of an HARQ-ACK slot 210 in which the UE acknowledges the two downlink carriers shown in FIG. 7. In FIG. 8, the first codeword 810 is a 10-symbol codeword signaling ACK or NACK for detected carrier C1, and DTX for carrier C2. The second codeword 820 is a 10-symbol codeword signaling ACK or NACK for detected carrier C3, and DTX for carrier C4. In an exemplary embodiment, codewords 810, 820 may be selected from the same codebook as specified in Rel-9 for DC-MIMO.

While FIGS. 7 and 8 have been shown for the case wherein carriers C2, C4 are the two of four carriers not detected by the UE, one of ordinary skill in the art will appreciate that the techniques disclosed herein may be readily applied to a case wherein another two carriers assigned to separate codewords are the two of four carriers not detected by the UE. For example, if carriers C2, C4 are detected, then the first codeword 810 in FIG. 8 may instead be chosen to signal DTX for C1 and ACK or NACK for C2, while the second codeword 820 may be chosen to signal DTX for C3 and ACK or NACK for C4. Similar techniques may be applied to the cases wherein only C2, C3 are detected, or only C1, C4 are detected. Such exemplary embodiments are contemplated to be within the scope of the present disclosure.

Figure 9:
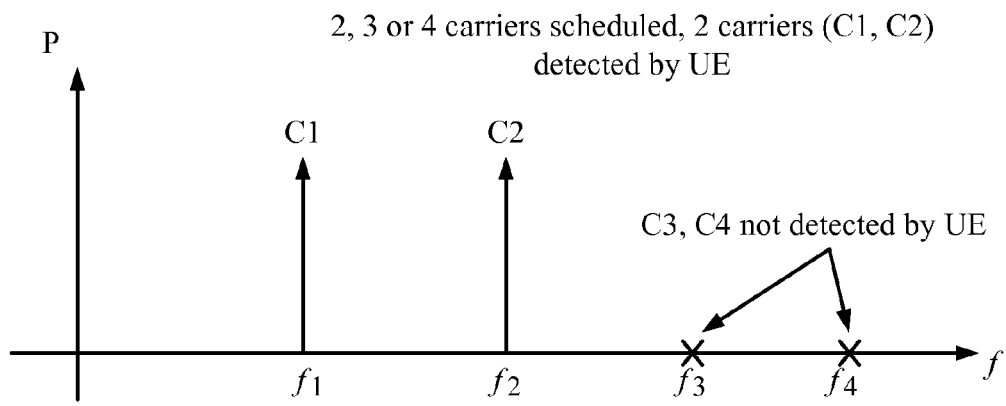
FIG. 9 illustrates an exemplary frequency spectrum showing two carriers C1, C2 detected by the UE at frequencies $f_1$, $f_2$, respectively, with either two, three or four downlink carriers scheduled for the UE.

FIG. 9 illustrates an exemplary frequency spectrum showing two carriers C1, C2 detected by the UE at frequencies $f_1$, $f_2$, respectively, with either two, three or four downlink carriers scheduled for the UE. In FIG. 9, carriers C1, C2 correspond to two carriers assigned to a single codeword signaled by the UE on the uplink. Note FIG. 9 is shown for illustrative purposes only, and is not meant to limit the scope of the present disclosure to any particular allocation of carrier frequencies to codewords. For example, in alternative exemplary embodiments (not shown), the two carriers allocated to a single codeword need not be contiguous in frequency. For example, in an exemplary embodiment, C1 and C3 (assigned to frequencies $f_1$ and $f_3$, respectively) may be encoded using a single codeword, and/or C2 and C4 (assigned to frequencies $f_2$ and $f_4$, respectively) may be encoded using a single codeword.

Figure 10A:
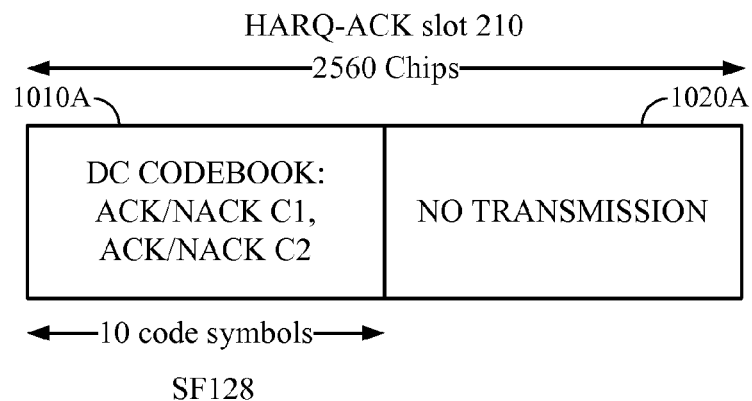
FIGS. 10A-E illustrate exemplary embodiments of schemes for the UE to signal the acknowledgment status of the two downlink carriers shown in FIG. 9.

FIG. 10A illustrates a first exemplary embodiment of a scheme for the UE to signal the acknowledgment status of the two downlink carriers shown in FIG. 9. In FIG. 10A, the first codeword 1010A is a 10-symbol codeword signaling ACK or NACK for detected carriers C1, C2. In an exemplary embodiment, codeword 1010A may be selected from the same codebook as specified in Rel-9 for DC-MIMO. During the second half 1020A of the slot, no codeword is transmitted, in response to carriers C3, C4 not being detected by the UE. In this case, the NodeB may interpret from the lack of UE transmissions during the second half 1020A that C3, C4 were not detected by the UE.

Figure 10B:
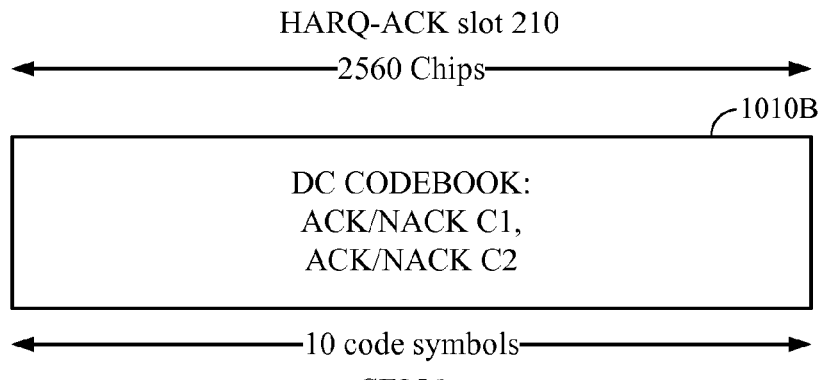

FIG. 10B illustrates a second exemplary embodiment of a scheme for the UE to signal the acknowledgment status of the two downlink carriers shown in FIG. 9. In FIG. 10B, a single 10-symbol codeword 1010B is spread using spreading factor 256 to signal ACK or NACK for detected carriers C1, C2. According to the second exemplary embodiment, the spreading factor for the HS-DPCCH may be changed on a per-slot basis from 128 to 256, and vice versa, depending on the number of carriers detected by the UE.

Note in this exemplary embodiment, the NodeB may ensure that the detection probability of C1, C2 by the UE is sufficiently high relative to the detection probability of C3, C4 such that the UE is expected to transmit a codeword only corresponding to C1, C2, and not C3, C4. In this case, the NodeB would then know to expect only a single codeword of spreading factor 256 corresponding to C1, C2 during the slot. Alternatively, if C3, C4 are scheduled but deactivated, then the Node B would also know to expect only a single codeword for C1, C2 during the slot.

Figure 10C:
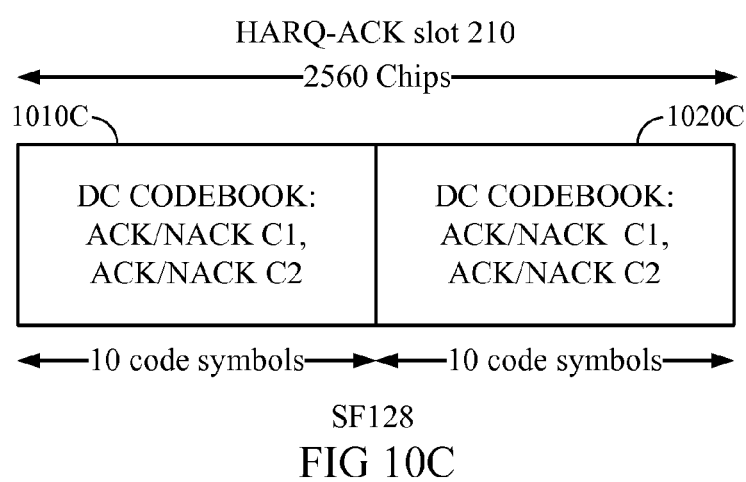

FIG. 10C illustrates a third exemplary embodiment of a scheme for the UE to acknowledge the two downlink carriers shown in FIG. 9. In FIG. 10C, to signal ACK or NACK for detected carriers C1, C2, a single 10-symbol codeword 1010C is spread using spreading factor 128, and repeated a second time during the second half of the slot 210 at 1020C.

Figure 10D:
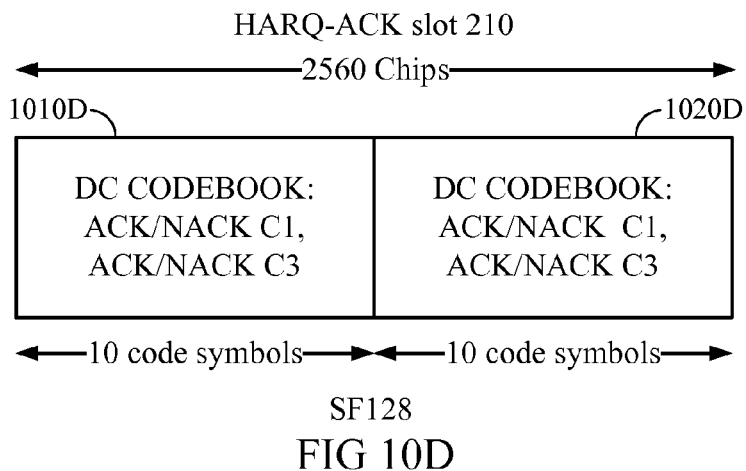

FIG. 10D illustrates an alternative scenario for the third exemplary embodiment, wherein the UE acknowledges reception of two carriers C1 and C3 assigned to a single codeword. Note this scenario may arise when, e.g., all four carriers C1, C2, C3, C4 are scheduled, but carriers C2 and C4 are deactivated, and thus C1 and C3 are assigned to a single codeword.

One of ordinary skill in the art will appreciate that the signaling techniques shown in FIGS. 10C and 10D may apply whenever two carriers (e.g., C1, C3 or C1, C4 or C2, C3 or C2, C4) are active. Furthermore, they may also apply, e.g., whenever four carriers are active and only two are detected.

Figure 10E:
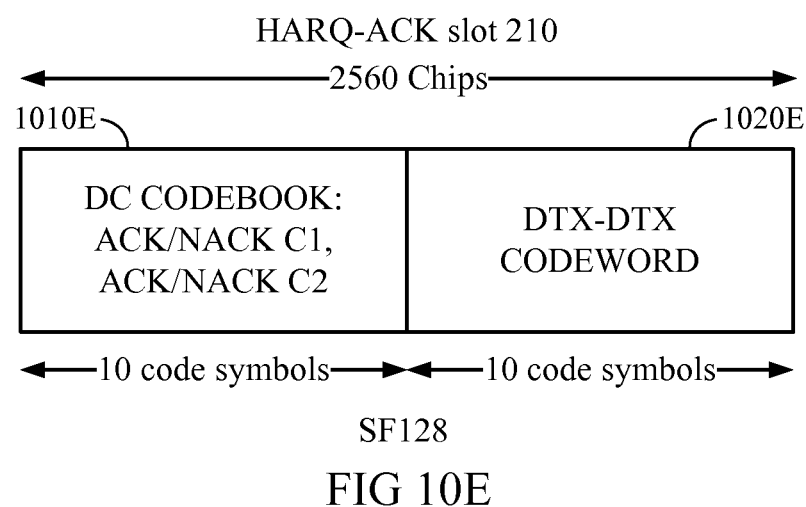

FIG. 10E illustrates a fourth exemplary embodiment of a scheme for the UE to acknowledge the two downlink carriers shown in FIG. 9. In FIG. 10E, in a first half of the slot, a single 10-symbol codeword 1010E is spread using spreading factor 128 to signal ACK or NACK for detected carriers C1, C2. In a second half of the slot, a 10-symbol DTX-DTX codeword 1020E is provided to signal that carriers C3, C4 were not detected by the UE. In an exemplary embodiment, the codebook provided in Rel-9 for DC-MIMO may be modified to include such an additional DTX-DTX codeword.

While FIG. 10E has been shown for the case wherein carriers C3, C4 are the two of four carriers not detected by the UE, one of ordinary skill in the art will appreciate that the techniques disclosed herein may be readily applied to any case wherein two undetected carriers are assigned to the same codeword. For example, if instead carriers C3, C4 are detected, and C1, C2 are undetected, then a DTX-DTX codeword may be provided in the first half of the slot in FIG. 10E, while a second codeword signaling ACK or NACK for C3, C4 may be provided in the second half of the slot. Such alternative exemplary embodiments are contemplated to be within the scope of the present disclosure.

It will be appreciated that the techniques of the present disclosure may be readily applied to signal ACK or NACK for both non-MIMO and MIMO carriers transmitted on the downlink. In particular, it will be appreciated that the techniques described herein may be readily modified to accommodate any or all of the following schemes utilizing MIMO carriers:

1) 4 MIMO DL carriers are configured, and any subset of the carriers is scheduled;

2) 3 MIMO DL carriers and 1 non-MIMO carrier are configured, and any subset of the carriers is scheduled;

3) 2 MIMO DL carriers and 2 non-MIMO carriers are configured, and any subset of the carriers is scheduled;

4) 1 MIMO and 3 non-MIMO carriers are configured, and any subset of the carriers is scheduled; and 5) 3 DL carriers with MIMO on 0, 1, 2, or 3 carriers (and non-MIMO on the rest of the carriers) are configured, and any subset of the carriers is scheduled.

Such alternative exemplary embodiments accommodating one or more MIMO carriers are contemplated to be within the scope of the present disclosure.

Figure 11A:
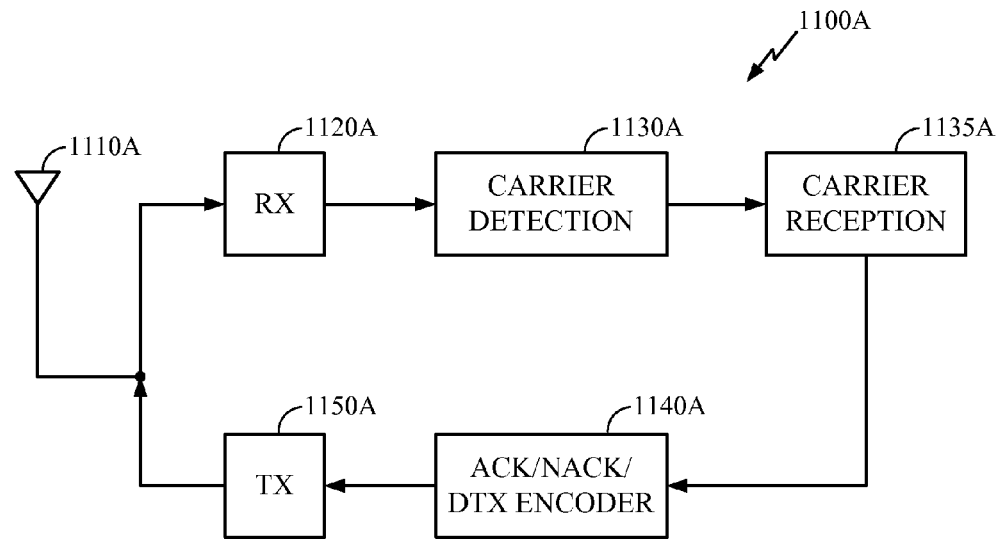
FIGS. 11A-B illustrate exemplary embodiments of apparatuses according to the present disclosure.

FIG. 11A illustrates an exemplary embodiment of a simplified apparatus 1100A according to the present disclosure. It will be appreciated that the apparatus 1100A is shown for illustrative purposes only, and is not meant to limit the scope of the present disclosure. One of ordinary skill in the art will appreciate that alternative exemplary embodiments may omit or combine any of the modules shown in FIG. 11A, and such alternative exemplary embodiments are contemplated to be within the scope of the present disclosure.

In FIG. 11A, a transmit/receive antenna 1110A is coupled to an RX module 1120A and a TX module 1150A. The RX module 1120A receives signals corresponding to one or more carriers of an HSDPA or MIMO system. The received signal is provided to a carrier detection module 1130A, which is configured to detect carriers present in the received signal. The output of the carrier detection module 1130A is provided to a carrier reception module 1135A, which decodes data from the one or more detected carriers. The outputs of the carrier detection module 1130A and carrier reception module 1135A are provided to an ACK/NACK/DTX (or acknowledgment status) encoder 1140A. The ACK/NACK/DTX encoder 1140A is configured to encode the acknowledgment status, e.g., ACK, NACK, or DTX, for the carriers in response to the output of the carrier detection module 1130A and carrier reception module 1135A. In an exemplary embodiment, the ACK/NACK/DTX encoder 1140A may apply the techniques of the present disclosure to generate codewords to be sent using the HS-DPCCH. The output of the encoder 1140A is provided to a TX module 1150A, which may be configured to choose a slot format (including spread factor) for transmitting the encoded signal. It will be appreciated that the apparatus 1100A may be, e.g., a UE in an HSDPA system.

Figure 11B:
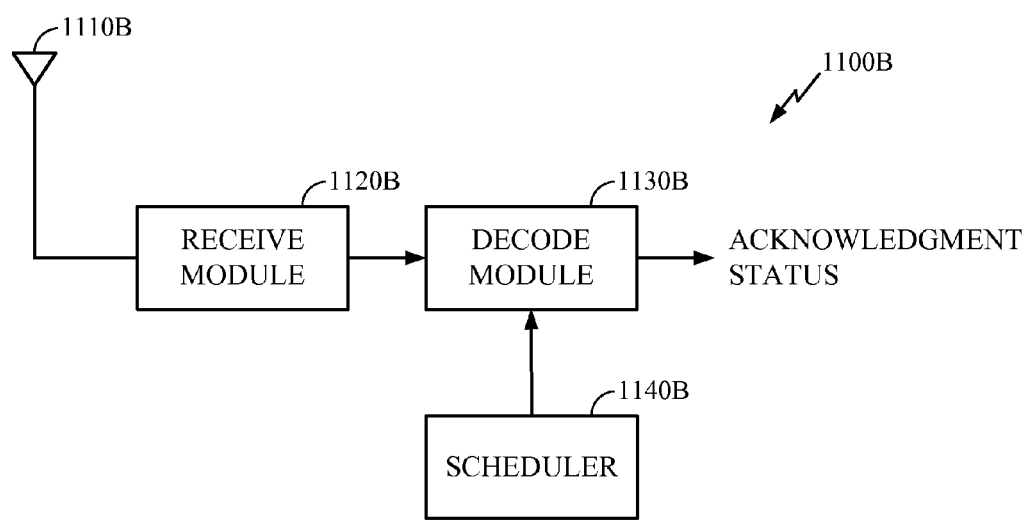

FIG. 11B illustrates an alternative exemplary embodiment of an apparatus 1100B according to the present disclosure. In FIG. 11B, a receive antenna 1110B is coupled to a receive module 1120B. The receive module 1120B may be configured to receive a codeword signaling acknowledgment status for first and second carriers during a first half of an HS-DPCCH slot. The receive module 1120B is further coupled to a decode module 1130B. The decode module 1130B may be configured to decode the received codeword signaling acknowledgment status for the carriers. The decode module 1130B may receive input from a scheduler 1140B so that the decode module 1130B knows which carriers are being scheduled and activated or deactivated, such that the appropriate codewords may be selected from the codebook for decoding. It will be appreciated that the apparatus 1100B may be, e.g., a NodeB.

Figure 12A:
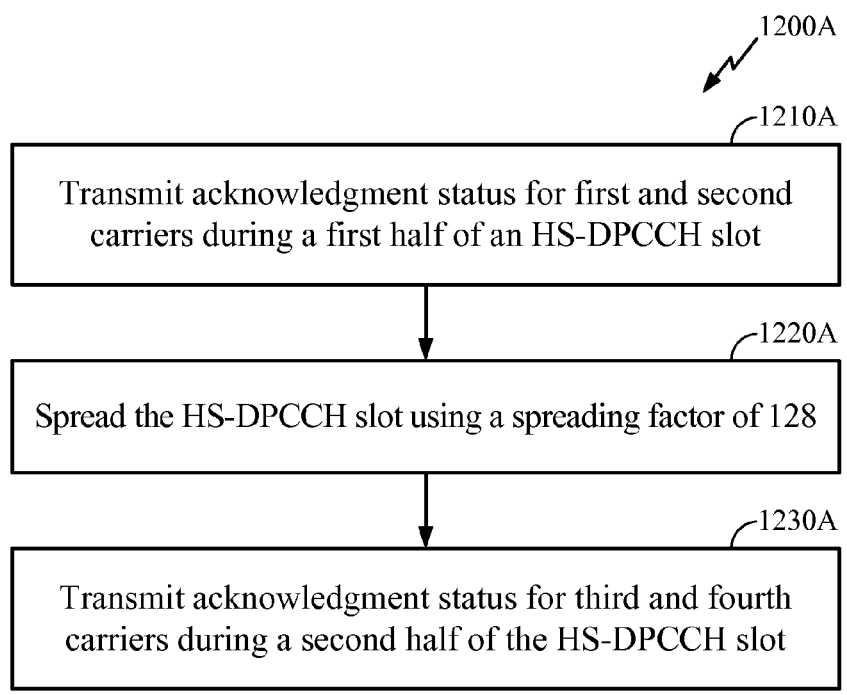
FIGS. 12A-12B illustrate exemplary embodiments of methods according to the present disclosure.

FIG. 12A illustrates an exemplary embodiment of a method 1200A according to the present disclosure. It will be appreciated that the method 1200A is shown for illustrative purposes only, and that in alternative exemplary embodiments, some of the blocks shown may be omitted, and other blocks provided, in accordance with the principles of the present disclosure.

At block 1210A, acknowledgment status for first and second carriers is transmitted during a first half of an HS-DPCCH slot.

At block 1220A, the HS-DPCCH slot is spread using a spreading factor of 128.

At block 1230A, acknowledgment status for third and fourth carriers is transmitted during a second half of the HS-DPCCH slot.

Figure 12B:
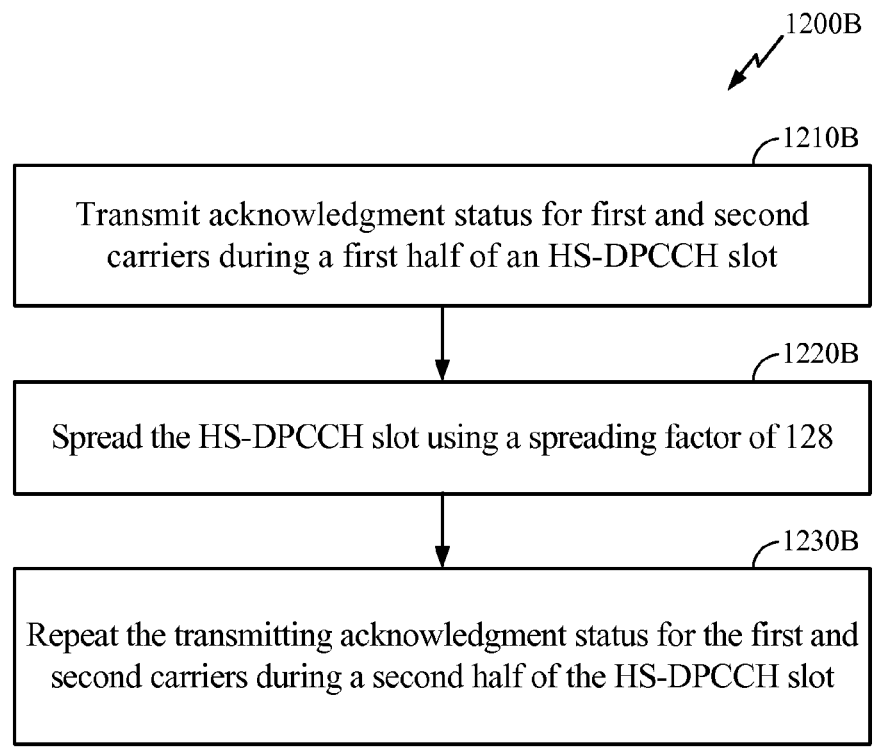

FIG. 12B illustrates an alternative exemplary embodiment of a method 1200B according to the present disclosure.

At block 1210B, acknowledgment status for first and second carriers is transmitted during a first half of an HS-DPCCH slot.

At block 1220B, the HS-DPCCH slot is spread using a spreading factor of 128.

At block 1230B, the transmitting the acknowledgment status for the first and second carriers is repeated during a second half of the HS-DPCCH slot.

Further described herein with reference to FIGS. 13A-13D is an example radio network operating according to UMTS in which the principles of the present disclosure may be applied. Note FIGS. 13A-13D are shown for illustrative background purposes only, and are not meant to limit the scope of the present disclosure to radio networks operating according to UMTS.

Figure 13A:
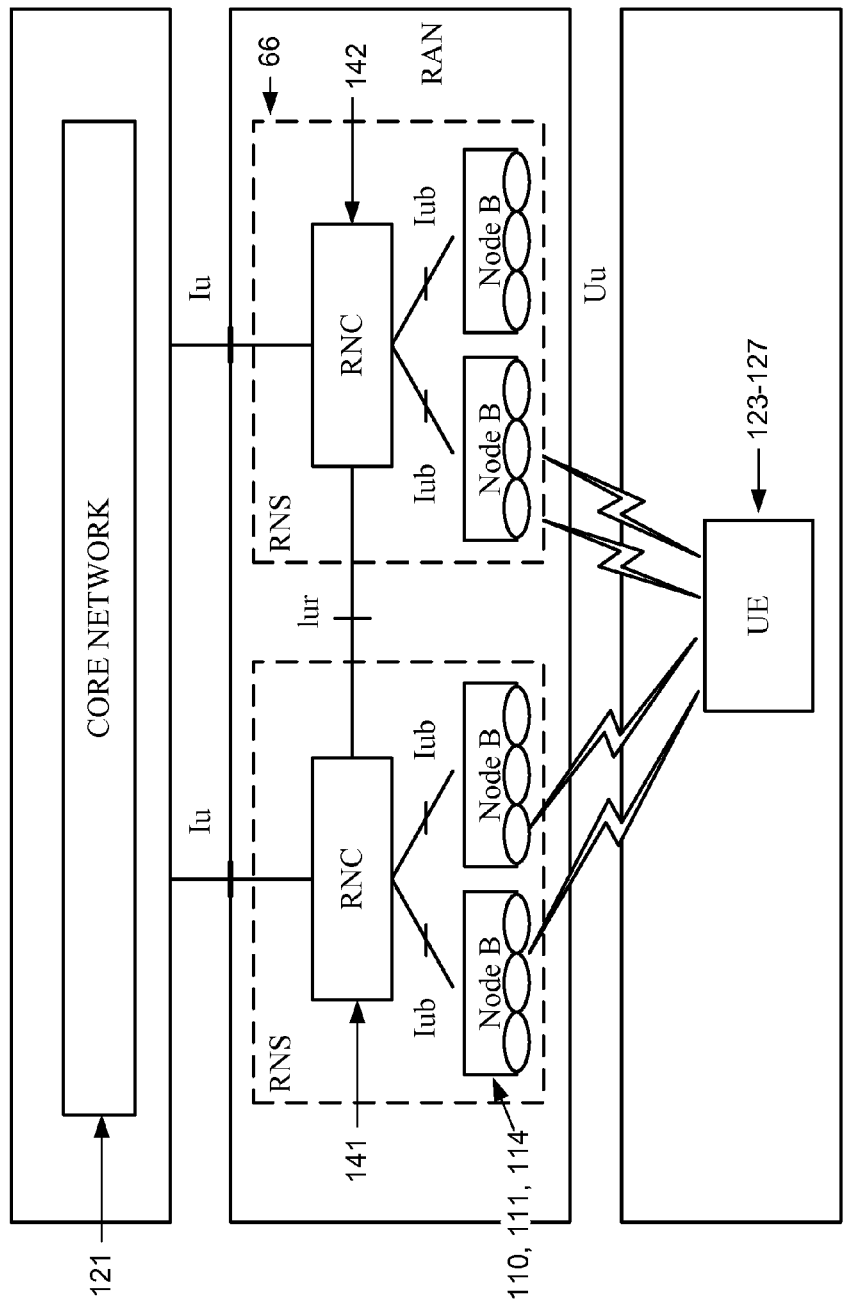
FIGS. 13A-13D illustrate an example radio network operating according to UMTS in which the principles of the present disclosure may be applied.

FIG. 13A illustrates an example of a radio network. In FIG. 13A, Node Bs 110, 111, 114 and radio network controllers 141-144 are parts of a network called "radio network," "RN," "access network," or "AN." The radio network may be a UMTS Terrestrial Radio Access Network (UTRAN). A UMTS Terrestrial Radio Access Network (UTRAN) is a collective term for the Node Bs (or base stations) and the control equipment for the Node Bs (or radio network controllers (RNC)) it contains which make up the UMTS radio access network. This is a 3 G communications network which can carry both real-time circuit-switched and IP-based packet-switched traffic types. The UTRAN provides an air interface access method for the user equipment (UE) 123-127. Connectivity is provided between the UE and the core network by the UTRAN. The radio network may transport data packets between multiple user equipment devices 123-127.

The UTRAN is connected internally or externally to other functional entities by four interfaces: Iu, Uu, Iub and Iur. The UTRAN is attached to a GSM core network 121 via an external interface called Iu. Radio network controllers (RNC's) 141-144 (shown in FIG. 13B), of which 141, 142 are shown in FIG. 13A, support this interface. In addition, the RNC manages a set of base stations called Node Bs through interfaces labeled Iub. The Iur interface connects two RNCs 141, 142 with each other. The UTRAN is largely autonomous from the core network 121 since the RNCs 141-144 are interconnected by the Iur interface. FIG. 13A discloses a communication system which uses the RNC, the Node Bs and the Iu and Uu interfaces. The Uu is also external and connects the Node B with the UE, while the Iub is an internal interface connecting the RNC with the Node B.

The radio network may be further connected to additional networks outside the radio network, such as a corporate intranet, the Internet, or a conventional public switched telephone network as stated above, and may transport data packets between each user equipment device 123-127 and such outside networks.

Figure 13B:
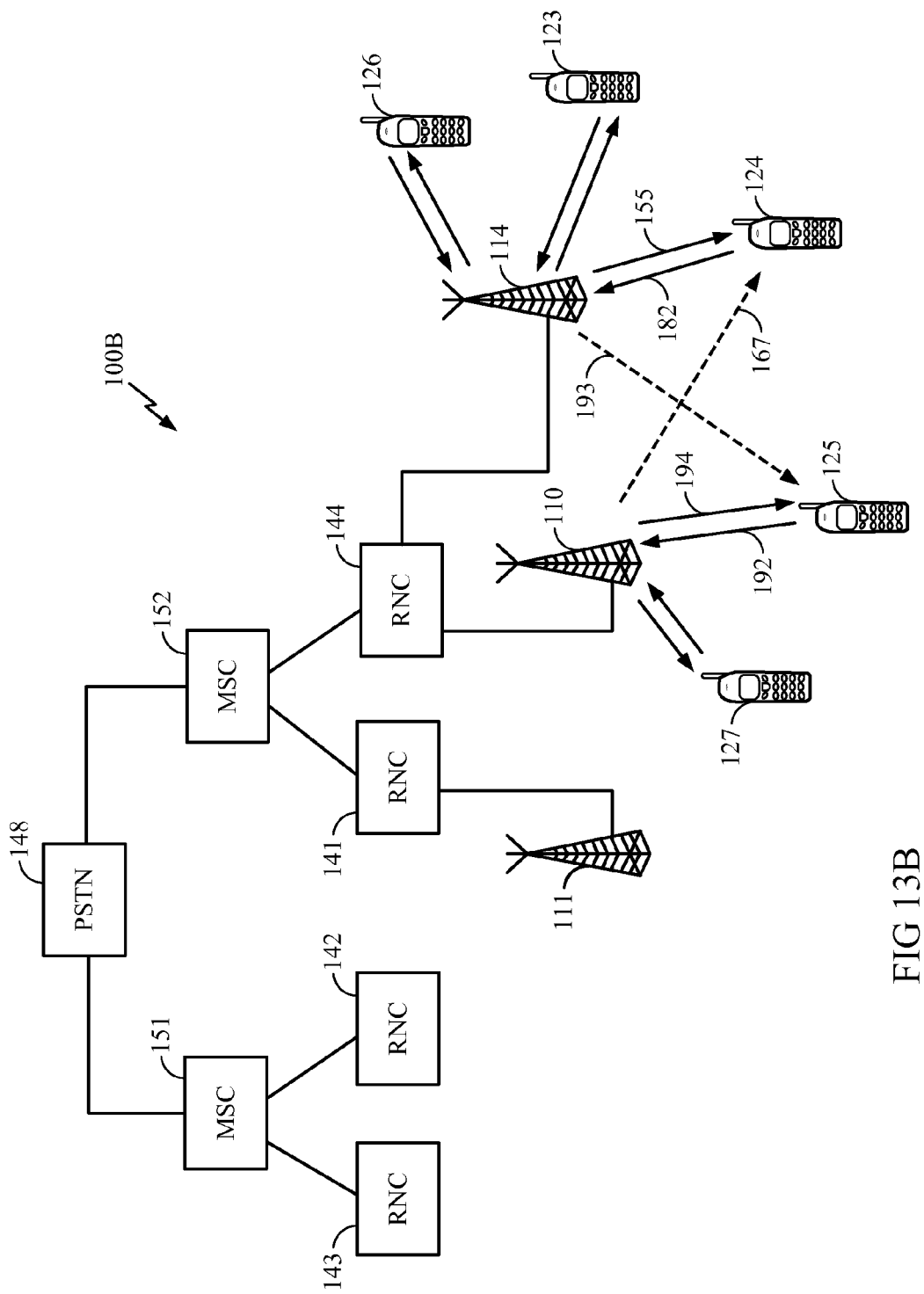

FIG. 13B illustrates selected components of a communication network 100B, which includes a radio network controller (RNC) (or base station controller (BSC)) 141-144 coupled to Node Bs (or base stations or wireless base transceiver stations) 110, 111, and 114. The Node Bs 110, 111, 114 communicate with user equipment (or remote stations) 123-127 through corresponding wireless connections 155, 167, 182, 192, 193, 194. The RNC 141-144 provides control functionalities for one or more Node Bs. The radio network controller 141-144 is coupled to a public switched telephone network (PSTN) 148 through a mobile switching center (MSC) 151, 152. In another example, the radio network controller 141-144 is coupled to a packet switched network (PSN) (not shown) through a packet data server node ("PDSN") (not shown). Data interchange between various network elements, such as the radio network controller 141-144 and a packet data server node, can be implemented using any number of protocols, for example, the Internet Protocol ("IP"), an asynchronous transfer mode ("ATM") protocol, T1, E1, frame relay, and other protocols.

The RNC fills multiple roles. First, it may control the admission of new mobiles or services attempting to use the Node B. Second, from the Node B, or base station, point of view, the RNC is a controlling RNC. Controlling admission ensures that mobiles are allocated radio resources (bandwidth and signal/noise ratio) up to what the network has available. It is where the Node B's Iub interface terminates. From the UE, or mobile, point of view, the RNC acts as a serving RNC in which it terminates the mobile's link layer communications. From a core network point of view, the serving RNC terminates the Iu for the UE. The serving RNC also controls the admission of new mobiles or services attempting to use the core network over its Iu interface.

For an air interface, UMTS most commonly uses a wideband spread-spectrum mobile air interface known as wideband code division multiple access (or W-CDMA). W-CDMA uses a direct sequence code division multiple access signaling method (or CDMA) to separate users. W-CDMA (Wideband Code Division Multiple Access) is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99.

The Release 99 specification defines two techniques to enable Uplink packet data. Most commonly, data transmission is supported using either the Dedicated Channel (DCH) or the Random Access Channel (RACH). However, the DCH is the primary channel for support of packet data services. Each remote station 123-127 uses an orthogonal variable spreading factor (OVSF) code. An OVSF code is an orthogonal code that facilitates uniquely identifying individual communication channels, as will be appreciated by one skilled in the art. In addition, micro diversity is supported using soft handover and closed loop power control is employed with the DCH.

Pseudorandom noise (PN) sequences are commonly used in CDMA systems for spreading transmitted data, including transmitted pilot signals. The time required to transmit a single value of the PN sequence is known as a chip, and the rate at which the chips vary is known as the chip rate. Inherent in the design of direct sequence CDMA systems is the requirement that a receiver aligns its PN sequences to those of the Node B 110, 111, 114. Some systems, such as those defined by the W-CDMA standard, differentiate base stations 110, 111, 114 using a unique PN code for each, known as a primary scrambling code. The W-CDMA standard defines two Gold code sequences for scrambling the downlink, one for the in-phase component (I) and another for the quadrature (Q). The I and Q PN sequences together are broadcast throughout the cell without data modulation. This broadcast is referred to as the common pilot channel (CPICH). The PN sequences generated are truncated to a length of 38,400 chips. A period of 38,400 chips is referred to as a radio frame. Each radio frame is divided into 15 equal sections referred to as slots. W-CDMA Node Bs 110, 111, 114 operate asynchronously in relation to each other, so knowledge of the frame timing of one base station 110, 111, 114 does not translate into knowledge of the frame timing of any other Node B 110, 111, 114. In order to acquire this knowledge, W-CDMA systems use synchronization channels and a cell searching technique.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Release 7 HSPA+ uses 3 enhancements to improve data rate. First, it introduced support for 2×2 MIMO on the downlink. With MIMO, the peak data rate supported on the downlink is 28 Mbps. Second, higher order modulation is introduced on the downlink. The use of 64 QAM on the downlink allows peak data rates of 21 Mbps. Third, higher order modulation is introduced on the uplink. The use of 16 QAM on the uplink allows peak data rates of 11 Mbps.

In HSUPA, the Node B 110, 111, 114 allows several user equipment devices 123-127 to transmit at a certain power level at the same time. These grants are assigned to users by using a fast scheduling algorithm that allocates the resources on a short-term basis (every tens of ms). The rapid scheduling of HSUPA is well suited to the bursty nature of packet data. During periods of high activity, a user may get a larger percentage of the available resources, while getting little or no bandwidth during periods of low activity.

In 3GPP Release 5 HSDPA, a base transceiver station 110, 111, 114 of an access network sends downlink payload data to user equipment devices 123-127 on High Speed Downlink Shared Channel (HS-DSCH), and the control information associated with the downlink data on High Speed Shared Control Channel (HS-SCCH). There are 256 Orthogonal Variable Spreading Factor (OVSF or Walsh) codes used for data transmission. In HSDPA systems, these codes are partitioned into release 1999 (legacy system) codes that are typically used for cellular telephony (voice), and HSDPA codes that are used for data services. For each transmission time interval (TTI), the dedicated control information sent to an HSDPA-enabled user equipment device 123-127 indicates to the device which codes within the code space will be used to send downlink payload data to the device, and the modulation that will be used for transmission of the downlink payload data.

With HSDPA operation, downlink transmissions to the user equipment devices 123-127 may be scheduled for different transmission time intervals using the 15 available HSDPA OVSF codes. For a given TTI, each user equipment device 123-127 may be using one or more of the 15 HSDPA codes, depending on the downlink bandwidth allocated to the device during the TTI. As has already been mentioned, for each TTI the control information indicates to the user equipment device 123-127 which codes within the code space will be used to send downlink payload data (data other than control data of the radio network) to the device, and the modulation that will be used for transmission of the downlink payload data.

In a MIMO system, there are N (# of transmitter antennas) by M (# of receiver antennas) signal paths from the transmit and the receive antennas, and the signals on these paths are not identical. MIMO creates multiple data transmission pipes. The pipes are orthogonal in the space-time domain. The number of pipes equals the rank of the system. Since these pipes are orthogonal in the space-time domain, they create little interference with each other. The data pipes are realized with proper digital signal processing by properly combining signals on the N×M paths. It is noted that a transmission pipe does not correspond to an antenna transmission chain or any one particular transmission path.

Communication systems may use a single carrier frequency or multiple carrier frequencies. Each link may incorporate a different number of carrier frequencies. Furthermore, an access terminal 123-127 may be any data device that communicates through a wireless channel or through a wired channel, for example using fiber optic or coaxial cables. An access terminal 123-127 may be any of a number of types of devices including but not limited to PC card, compact flash, external or internal modem, or wireless or wireline phone. The access terminal 123-127 is also known as user equipment (UE), a remote station, a mobile station or a subscriber station. Also, the UE 123-127 may be mobile or stationary.

User equipment 123-127 that has established an active traffic channel connection with one or more Node Bs 110, 111, 114 is called active user equipment 123-127, and is said to be in a traffic state. User equipment 123-127 that is in the process of establishing an active traffic channel connection with one or more Node Bs 110, 111, 114 is said to be in a connection setup state. User equipment 123-127 may be any data device that communicates through a wireless channel or through a wired channel, for example using fiber optic or coaxial cables. The communication link through which the user equipment 123-127 sends signals to the Node B 110, 111, 114 is called an uplink. The communication link through which a NodeB 110, 111, 114 sends signals to a user equipment 123-127 is called a downlink.

Figure 13C:
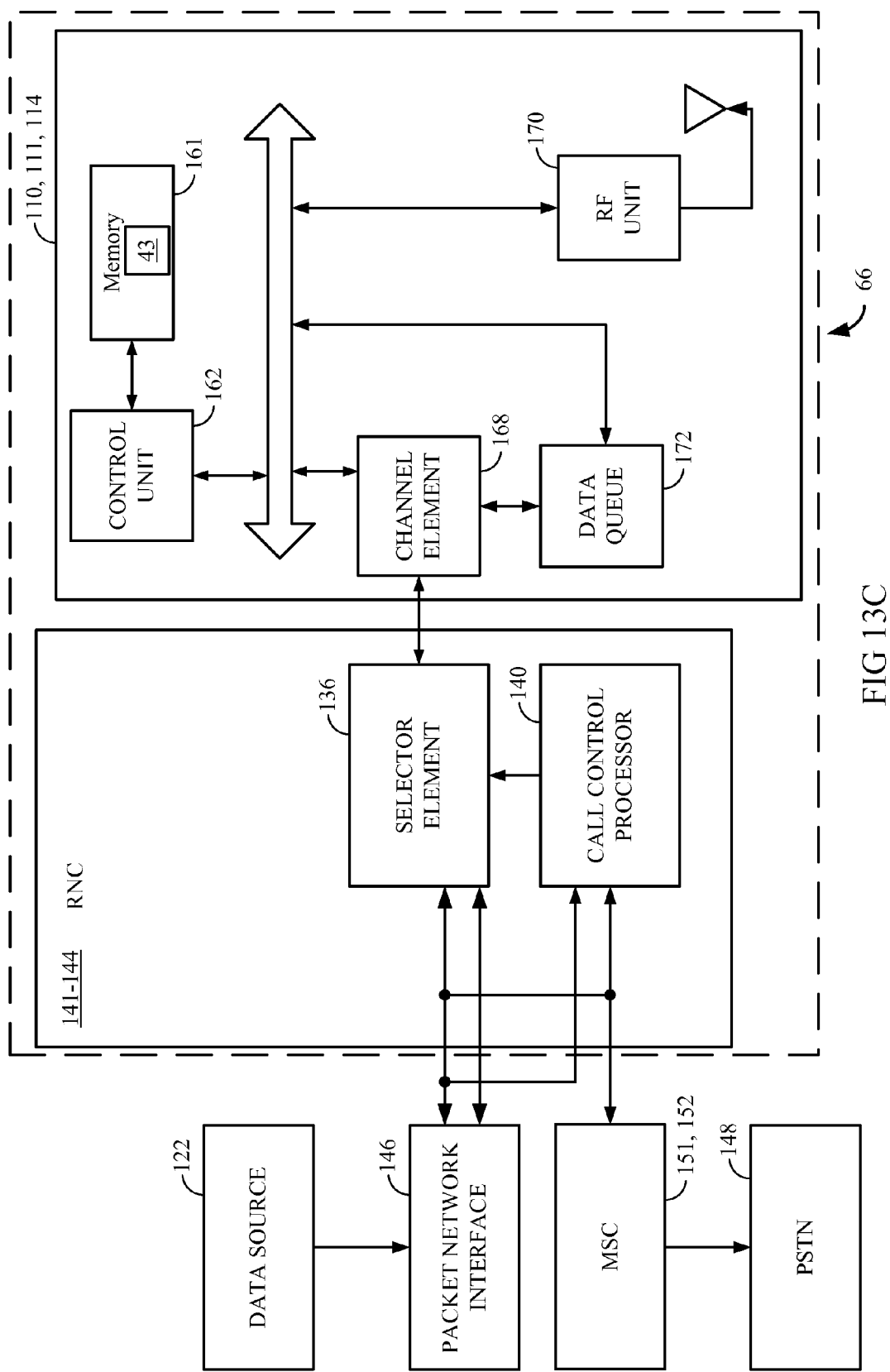

FIG. 13C is detailed herein below, wherein specifically, a Node B 110, 111, 114 and radio network controller 141-144 interface with a packet network interface 146. (Note in FIG. 13C, only one Node B 110, 111, 114 is shown for simplicity.) The Node B 110, 111, 114 and radio network controller 141-144 may be part of a radio network server (RNS) 66, shown in FIG. 13A and in FIG. 13C as a dotted line surrounding one or more Node Bs 110, 111, 114 and the radio network controller 141-144. The associated quantity of data to be transmitted is retrieved from a data queue 172 in the Node B 110, 111, 114 and provided to the channel element 168 for transmission to the user equipment 123-127 (not shown in FIG. 7C) associated with the data queue 172.

Radio network controller 141-144 interfaces with a Public Switched Telephone Network (PSTN) 148 through a mobile switching center 151, 152. Also, radio network controller 141-144 interfaces with Node Bs 110, 111, 114 in the communication system 100B. In addition, radio network controller 141-144 interfaces with a Packet Network Interface 146. Radio network controller 141-144 coordinates the communication between user equipment 123-127 in the communication system and other users connected to a packet network interface 146 and PSTN 148. PSTN 148 interfaces with users through a standard telephone network (not shown in FIG. 13C).

Radio network controller 141-144 contains many selector elements 136, although only one is shown in FIG. 13C for simplicity. Each selector element 136 is assigned to control communication between one or more Node B's 110, 111, 114 and one remote station 123-127 (not shown). If selector element 136 has not been assigned to a given user equipment 123-127, call control processor 140 is informed of the need to page the user equipment 123-127. Call control processor 140 then directs Node B 110, 111, 114 to page the user equipment 123-127.

Data source 122 contains a quantity of data, which is to be transmitted to a given user equipment 123-127. Data source 122 provides the data to packet network interface 146. Packet network interface 146 receives the data and routes the data to the selector element 136. Selector element 136 then transmits the data to Node B 110, 111, 114 in communication with the target user equipment 123-127. In the exemplary embodiment, each Node B 110, 111, 114 maintains a data queue 172, which stores the data to be transmitted to the user equipment 123-127.

For each data packet, channel element 168 inserts the necessary control fields. In the exemplary embodiment, channel element 168 performs a cyclic redundancy check, CRC, encoding of the data packet and control fields and inserts a set of code tail bits. The data packet, control fields, CRC parity bits, and code tail bits comprise a formatted packet. In the exemplary embodiment, channel element 168 then encodes the formatted packet and interleaves (or reorders) the symbols within the encoded packet. In the exemplary embodiment, the interleaved packet is covered with a Walsh code, and spread with the short PNI and PNQ codes. The spread data is provided to RF unit 170 which quadrature modulates, filters, and amplifies the signal. The downlink signal is transmitted over the air through an antenna to the downlink.

At the user equipment 123-127, the downlink signal is received by an antenna and routed to a receiver. The receiver filters, amplifies, quadrature demodulates, and quantizes the signal. The digitized signal is provided to a demodulator where it is despread with the short PNI and PNQ codes and decovered with the Walsh cover. The demodulated data is provided to a decoder which performs the inverse of the signal processing functions done at Node B 110, 111, 114, specifically the de-interleaving, decoding, and CRC check functions. The decoded data is provided to a data sink.

Figure 13D:
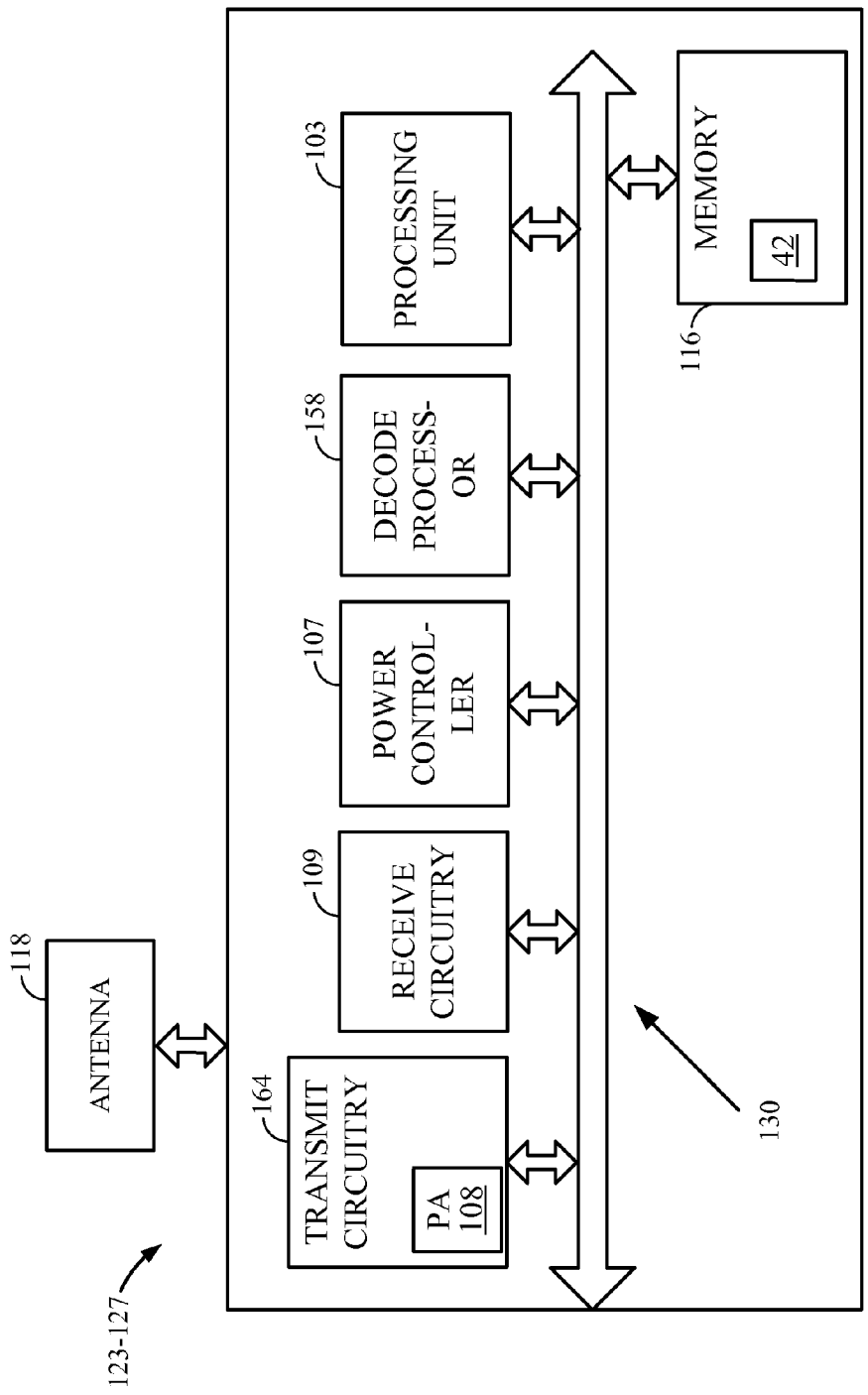

FIG. 13D illustrates an embodiment of a user equipment (UE) 123-127 in which the UE 123-127 includes transmit circuitry 164 (including PA 108), receive circuitry 109, power controller 107, decode processor 158, processing unit 103, and memory 116.

The processing unit 103 controls operation of the UE 123-127. The processing unit 103 may also be referred to as a CPU. Memory 116, which may include both read-only memory (ROM) and random access memory (RAM), provides instructions and data to the processing unit 103. A portion of the memory 116 may also include non-volatile random access memory (NVRAM).

The UE 123-127, which may be embodied in a wireless communication device such as a cellular telephone, may also include a housing that contains a transmit circuitry 164 and a receive circuitry 109 to allow transmission and reception of data, such as audio communications, between the UE 123-127 and a remote location. The transmit circuitry 164 and receive circuitry 109 may be coupled to an antenna 118.

The various components of the UE 123-127 are coupled together by a bus system 130 which may include a power bus, a control signal bus, and a status signal bus in addition to a data bus. However, for the sake of clarity, the various busses are illustrated in FIG. 10E as the bus system 130. The UE 123-127 may also include a processing unit 103 for use in processing signals. Also shown are a power controller 107, a decode processor 158, and a power amplifier 108.

The steps of the methods discussed may also be stored as instructions in the form of software or firmware 43 located in memory 161 in the Node B 110, 111, 114, as shown in FIG. 10C. These instructions may be executed by the control unit 162 of the Node B 110, 111, 114 in FIG. 10C. Alternatively, or in conjunction, the steps of the methods discussed may be stored as instructions in the form of software or firmware 42 located in memory 116 in the UE 123-127. These instructions may be executed by the processing unit 103 of the UE 123-127 in FIG. 10E.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of wireless communication at a user equipment (UE), comprising:
spreading an HS-DPCCH slot using a spreading factor of 128;
transmitting acknowledgment status for first and second carriers during a first half of the HS-DPCCH slot; and
transmitting acknowledgment status for a second half of the HS-DPCCH slot, wherein the second half comprises acknowledgment status for a repeat acknowledgment for the first and second carriers and one or both of third and fourth carriers, wherein the transmitting of the acknowledgement status for the first and second carriers comprises transmitting a codeword selected from a DC-MIMO codebook specified in Rel-9 of the W-CDMA standard or a DC-HSDPA codebook specified in Rel-9 of the W-CDMA standard, the first and second carriers corresponding to respective logical carriers, and the UE configured to receive at least three carriers.

2. The method of claim 1, wherein the first half precedes the second half in time.

3. The method of claim 1, wherein the first and second carriers correspond to a first logical carrier and a third logical carrier, respectively, wherein a second logical carrier is deactivated.

4. The method of claim 1, wherein the transmitting of the acknowledgment status for the first and second carriers comprises transmitting the codeword from the DC-HSDPA codebook, wherein the DC-HSDPA codebook is augmented to include a DTX-DTX codeword.

5. The method of claim 1, wherein the transmitting of the acknowledgment status for the first and second carriers comprises transmitting the codeword from the DC-MIMO codebook, wherein the DC-MIMO codebook is augmented to include a DTX-DTX codeword.

6. The method of claim 1, wherein transmitting acknowledgment status for one or both the third and fourth carrier carriers comprises transmitting a codeword selected from a single-carrier codebook specified in the W-CDMA standard.

7. The method of claim 1, wherein transmitting acknowledgment status for the third carrier comprises transmitting a dual carrier codeword, the dual carrier codeword further specifying DTX for the fourth carrier.

8. The method of claim 1, further comprising, during a second HS-DPCCH slot:
spreading the second slot using a spreading factor of 256, wherein transmitting the acknowledgment status for the first and second carriers comprises transmitting the codeword from the DC-MIMO codebook during the full duration of the second slot.

9. The method of claim 1, wherein at least one of the first and second carriers is configured to support MIMO.

10. A user equipment (UE) apparatus, comprising:
a carrier detection module configured to detect at least one carrier present in a received signal for an HSDPA system;

a carrier reception module configured to decode data from at least one detected carrier;

an encoder configured to generate a first codeword signaling acknowledgment status for first and second carriers and a second codeword signaling acknowledgment status for a repeat acknowledgment for the first and second carrier and one or both of third and fourth carriers based on the output of the carrier detection module and the carrier reception module; and a transmit module configured to transmit the first codeword during a first half of an HS-DPCCH slot and the second codeword during a second half of the HS-DPCCH, wherein the HS-DPCCH slot is spread using a spreading factor of 128, and the transmit module further configured to transmit the acknowledgment status for the first and second carriers by transmitting a codeword selected from a DC-MIMO codebook specified in Rel-9 of the W-CDMA standard or a DC-HSDPA codebook specified in Rel-9 of the W-CDMA standard, the first and second carriers corresponding to respective logical carriers, and the UE configured to receive at least three carriers.

11. The apparatus of claim 10, wherein the transmit module is further configured to transmit the acknowledgment status for the first and second carriers by transmitting the codeword from the DC-MIMO codebook, wherein the DC-MIMO codebook is augmented to include a DTX-DTX codeword.

12. The apparatus of claim 10, wherein the transmit module is further configured to transmit the acknowledgment status for one or both of the third and fourth carriers by transmitting the codeword selected from a single-carrier codebook specified in the W-CDMA standard.

13. The apparatus of claim 10, wherein the transmit module is further configured to transmit the acknowledgment status for one or both of the third and fourth carriers by transmitting a dual carrier codeword, the dual carrier codeword specifying DTX for the fourth carrier.

14. The apparatus of claim 10, wherein the transmit module is further configured to, during a second HS-DPCCH slot:
spread the second slot using a spreading factor of 256; and
transmit the codeword for the first and second carriers selected from the DC-MIMO codebook during the full duration of the second slot.

15. A user equipment (UE) apparatus, comprising:
means for spreading an HS-DPCCH slot using a spreading factor of 128;
means for transmitting acknowledgment status for first and second carriers during a first half of the HS-DPCCH slot; and
means for transmitting acknowledgment status for a second half of the HS-DPCCH slot, wherein the second half comprises acknowledgment status for a repeat acknowledgment for the first and second carriers and one or both of third and fourth carriers, wherein the means for transmitting the acknowledgement status for the first and second carriers is further configured to transmit a codeword selected from a DC-MIMO codebook specified in Rel-9 of the W-CDMA standard or a DC-HSDPA codebook specified in Rel-9 of the W-CDMA standard, the first and second carriers corresponding to respective logical carriers, and the UE configured to receive at least three carriers.

16. A non-transitory computer-readable storage medium storing instructions for causing a user equipment (UE) to:
spread an HS-DPCCH slot using a spreading factor of 128;
transmit acknowledgment status for first and second carriers during a first half of an HS-DPCCH slot; and
transmit acknowledgment status for a second half of the HS-DPCCH slot, wherein the second half comprises acknowledgment status for a repeat acknowledgment for the first and second carrier and one or both of third and fourth carriers, wherein the instructions for causing the UE to transmit the acknowledgement status for the first and second carrier are configured to cause the UE to transmit a codeword selected from a DC-MIMO codebook specified in Rel-9 of the W-CDMA standard or a DC-HSDPA codebook specified in Rel-9 of the W-CDMA standard, the first and second carriers corresponding to respective logical carriers, and the UE configured to receive at least three carriers.

17. A method for communicating with a user equipment (UE) configured to receive at least three carriers, comprising:
receiving acknowledgment status for first and second carriers during a first half of an HS-DPCCH slot, wherein the HS-DPCCH slot is spread by a spreading factor of 128; and
receiving acknowledgment status for a second half of the HS-DPCCH slot, wherein the second half comprises acknowledgment status for a repeat acknowledgment for the first and second carriers and one or both of third and fourth carriers, wherein receiving the acknowledgement status for the first and second carriers comprises receiving a codeword selected from a DC-MIMO codebook specified in Rel-9 of the W-CDMA standard or a DC-HSDPA codebook specified in Rel-9 of the W-CDMA standard, and the first and second carriers corresponding to respective logical carriers.

18. An apparatus for communicating with a user equipment (UE) configured to receive at least three carriers, comprising:
a receive module configured to receive a first codeword signaling acknowledgment status for first and second carriers during a first half of an HS-DPCCH slot and second codeword signaling acknowledgment status for a repeat acknowledgment for the for the first and second carriers and one or both of third and fourth carriers, wherein the HS-DPCCH slot is spread by a spreading factor of 128,
wherein the receive module is further configured to receive a codeword selected from a DC-MIMO codebook specified in Rel-9 of the W-CDMA standard or a DC-HSDPA codebook specified in Rel-9 of the W-CDMA standard, and the first and second carriers corresponding to respective logical carriers; and
a decode module configured to decode the codeword signaling acknowledgment status.

* * * * *